United States Patent
Hessling-Von Heimendahl et al.

(10) Patent No.: US 10,683,982 B2
(45) Date of Patent: Jun. 16, 2020

(54) HELICOPTER SEARCH LIGHT AND METHOD OF OPERATING A HELICOPTER SEARCH LIGHT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE); Robert Trinschek, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/111,680

(22) Filed: Aug. 24, 2018

(65) Prior Publication Data

US 2019/0063713 A1    Feb. 28, 2019

(30) Foreign Application Priority Data

Aug. 24, 2017   (EP) .................................. 17187801

(51) Int. Cl.
*F21S 41/675*    (2018.01)
*F21S 41/32*    (2018.01)
(Continued)

(52) U.S. Cl.
CPC ............ *F21S 41/675* (2018.01); *B64D 47/02* (2013.01); *B64D 47/04* (2013.01); *F21S 8/003* (2013.01);
(Continued)

(58) Field of Classification Search
CPC ...... F21S 10/026; F21S 10/003; F21S 41/125; F21S 41/141; F21S 41/32; F21S 41/663;
(Continued)

(56) References Cited

U.S. PATENT DOCUMENTS 5,951,139 A * 9/1999 Smith ........................ F21V 9/04
362/238
6,191,547 B1 * 2/2001 Fricke ..................... B60Q 1/245
318/17

(Continued)

FOREIGN PATENT DOCUMENTS

EP    3040282 A1    7/2016
WO    9637731 A1    11/1996

OTHER PUBLICATIONS

Extended European Search Report for International Application No. 17187801.0 dated Feb. 28, 2018, 6 pages.

*Primary Examiner* — Anh T Mai
*Assistant Examiner* — Michael Chiang
(74) *Attorney, Agent, or Firm* — Cantor Colburn LLP

(57) ABSTRACT

A helicopter search light comprises a housing with a mounting portion, which is configured to be mounted to a helicopter, a light source support arranged within the housing and at least one optical system. Each optical system includes a group of at least two light sources with different light emission characteristics, which are arranged on the light source support; and a reflector, which is movable between at least two discrete positions, each position being associated with one of the at least two light sources, with the reflector in each position only reflecting light emitted by the associated light source. The helicopter search light further comprises at least one actuator, which is configured for selectively moving the reflector between the at least two discrete positions.

19 Claims, 6 Drawing Sheets

(51) Int. Cl.

| | |
|---|---|
| *F21S 41/141* | (2018.01) |
| *H02K 41/03* | (2006.01) |
| *B64D 47/04* | (2006.01) |
| *F21S 10/02* | (2006.01) |
| *F21S 8/00* | (2006.01) |
| *B64D 47/02* | (2006.01) |
| *F21V 14/04* | (2006.01) |
| *F21V 7/06* | (2006.01) |
| *F21Y 115/10* | (2016.01) |
| *F21Y 113/13* | (2016.01) |
| *F21Y 105/18* | (2016.01) |
| *F21W 107/30* | (2018.01) |
| *B60Q 1/24* | (2006.01) |

(52) U.S. Cl.
CPC .......... *F21S 10/026* (2013.01); *F21S 41/141* (2018.01); *F21S 41/32* (2018.01); *F21V 14/04* (2013.01); *H02K 41/031* (2013.01); *B60Q 1/245* (2013.01); *B64D 2203/00* (2013.01); *F21V 7/06* (2013.01); *F21W 2107/30* (2018.01); *F21Y 2105/18* (2016.08); *F21Y 2113/13* (2016.08); *F21Y 2115/10* (2016.08)

(58) Field of Classification Search
CPC ....... F21S 41/675; F21S 10/023; F21V 14/04; B64D 47/04; H02K 41/031; F21Y 2105/18; F21W 2107/30; F21W 2131/406
See application file for complete search history.

(56) References Cited

U.S. PATENT DOCUMENTS

| | | | |
|---|---|---|---|
| 6,474,837 B1* | 11/2002 | Belliveau | F21L 4/027 362/231 |
| 8,226,265 B2 | 7/2012 | Czajkowski et al. | |
| 8,657,464 B2* | 2/2014 | Lundberg | F21V 14/04 362/232 |
| 9,719,664 B1 | 8/2017 | Deyaf et al. | |
| 9,739,440 B1 | 8/2017 | Deyaf et al. | |
| 9,995,468 B2* | 6/2018 | Liang | F21V 19/04 |
| 2003/0086251 A1 | 5/2003 | Hamilton et al. | |
| 2003/0218881 A1* | 11/2003 | Hansen | F21S 10/007 362/293 |
| 2004/0066142 A1 | 4/2004 | Stimac et al. | |
| 2006/0226713 A1* | 10/2006 | Lehr | F16C 29/02 310/12.04 |
| 2009/0207596 A1* | 8/2009 | Richmond | F21V 21/0824 362/159 |
| 2009/0268458 A1* | 10/2009 | Feinbloom | F21V 14/06 362/240 |
| 2014/0015410 A1* | 1/2014 | Shibata | B60Q 1/1407 315/82 |
| 2014/0119005 A1* | 5/2014 | Jorgensen | F21S 10/026 362/231 |
| 2014/0185285 A1* | 7/2014 | Jorgensen | F21V 14/02 362/232 |
| 2014/0321135 A1* | 10/2014 | Chen | F21S 41/143 362/487 |
| 2016/0313094 A1* | 10/2016 | Lee | F41H 7/042 |

* cited by examiner

HELICOPTER SEARCH LIGHT AND METHOD OF OPERATING A HELICOPTER SEARCH LIGHT

FOREIGN PRIORITY

This application claims priority to European Patent Application No. 17187801.0 filed Aug. 24, 2017, the entire contents of which is incorporated herein by reference.

TECHNICAL FIELD

The invention relates to a helicopter search light, in particular to a helicopter search light with selectable light characteristics.

BACKGROUND

Helicopter search lights, such as helicopter headlamps, which are used in search and rescue missions, need to cover a wide range of different environmental conditions from poorest visibility conditions in heavy rain or snowfall, where human light level adaptation is the key, to high visibility scenarios, where different dim levels are desirable.

It therefore would be beneficial to provide a helicopter search light which allows for selectively switching between different characteristics of the emitted light while providing a high efficiency and/or reliability of the helicopter search light.

SUMMARY

According to an exemplary embodiment of the invention, a helicopter search light comprises a housing with a mounting portion, which is configured to be mounted to a helicopter, a light source support arranged within the housing, and at least one optical system. Each optical system comprises a reflector and a group of at least two light sources which are arranged on the light source support. The at least two light sources have different light emission characteristics. The reflector is movable between at least two discrete positions, each position being associated with one of the light sources. In each position, the reflector reflects only light emitted by the associated light source. The helicopter search light further comprises at least one actuator, which is configured for selectively moving the reflector between the at least two discrete positions.

Exemplary embodiments further include a helicopter comprising a helicopter search light according to exemplary embodiments of the invention.

Exemplary embodiments also include a method of operating a helicopter search light comprising at least one optical system, each optical system including a group of at least two light sources having different light emission characteristics, and a reflector, which is movable between at least two discrete positions, each position being associated with one of the at least two light sources, and comprising at least one actuator, which is configured for selectively moving the reflector between the at least two discrete positions, wherein the method comprises operating the at least one actuator for moving the reflector into a desired position in which the reflector reflects the light of a selected light source. The method further includes supplying electrical power to the selected light source.

As the light emitted by each of the at least two light sources has different characteristics than the light emitted by the other light source(s), the characteristics of the light emitted by the optical system may be selectively modified by moving the light reflector with respect to the at least two light sources without degrading the efficiency and/or reliability of the helicopter search light.

The light emitted by the different light sources in particular may have different colors, wavelengths and/or spectra.

In an embodiment, the group of light sources may comprise two to five different light sources emitting light having different characteristics. The different light characteristics in particular may be selected from "white light" having a color temperature of 4000 to 6900 K, "deep red light" having a wavelength of more than 630 nm, "selective yellow light" with less than 50% spectral distribution power (SPD) below 500 nm vs. the overall peak, "mint light" including wavelengths between 480 nm and 515 nm, and infrared (IR) light, which is not visible to the human eye but may be seen by an appropriate camera, such as a camera of a night vision device.

In an embodiment, the helicopter search light comprises a plurality of optical systems. By employing a plurality of optical systems the intensity of the light emitted by the helicopter search light may be increased.

In an embodiment, the plurality of optical systems may be synchronized so that the reflectors of the different optical systems move (only) simultaneously. The optical system in particular may be configured so that all optical systems emit at a given point of time light having the same characteristics, i.e. light having the same wavelengths and/or spectra. Alternatively, the optical systems may be configured to simultaneously emit light of different characteristics so that the light emitted by the helicopter search light is a mixture of a plurality of light emissions having different characteristics.

In an embodiment, the reflectors of all optical systems are configured to be moved by a common actuator. Providing only a single actuator reduces the costs of the helicopter search light. In an alternative embodiment, a plurality of actuators may be used in order to provide a symmetric actuation, which may help to enhance the accuracy of the optical system.

In an embodiment, the mechanical structure of the plurality of optical systems may be identical. In particular, the structure/shape of the reflectors of the plurality of optical systems may be identical and the same types of light sources may be used in the plurality of optical systems.

In an embodiment, the reflector is a parabolic reflector or substantially parabolic reflector. In a particular embodiment, the reflector is arranged so that an associated light source is located in the vertex of the reflector, when the reflector is in the position associated with the respective light source. Arranging a light source in the vertex of a reflector, in particular in the vertex of a parabolic reflector, results in an effective reflection and focusing of the light emitted by the light source.

In an embodiment, the reflector(s) may be attached to a movable reflector carrier. In particular, a plurality of reflectors of a plurality of optical systems may be attached to a common movable reflector carrier in order to be moved only simultaneously. Employing a common reflector carrier allows for moving the plurality of reflectors simultaneously, in particular employing only a single actuator.

In an embodiment, the reflector carrier is movably mounted to the light source support. Mounting the reflector carrier to the light source support results in a compact configuration of the helicopter search light.

In an embodiment, the optical systems are arranged along a circular outline, and the reflector carrier is rotatable for moving the reflector(s) along said circular outline. Such a configuration allows moving the reflector(s) conveniently and reliably between the different discrete positions with high positional accuracy, in particular with a positional accuracy of up to 0.01". In this way, a particularly high optical efficiency of the helicopter search light may be achieved for different light emission characteristics.

In helicopter search lights, common vibrational loads are typically oriented in a longitudinal direction, and rotational vibrations are minimal. Thus, providing a rotatable reflector reduces the risk of misalignment of the reflectors caused by vibrations.

In an embodiment, six optical systems are arranged on the circular outline in a configuration having a sixfold rotational symmetry. In alternative embodiments, between two and ten, e.g. three, four, five, seven or eight, optical systems may be employed. This, of course, will result in different types of symmetry. In general, a plurality of optical systems may be employed in a rotationally symmetric manner.

In an embodiment, the reflector carrier is rotatable by not more than +/− 20°, in particular by not more than +/− 14° or 15°, more particularly by not more than +/− 10° from a reference position. In other words, the reflector carrier may be rotatable by at most +/− 20°, in particular by at most +/− 14° or +/− 15°, more in particular by at most +/− 10° from a reference position. In a particular embodiment, the reflector carrier may be rotatable by between +/− 10° and +/− 15° from a reference position. In case the angular range of rotational movement of the reflector carrier is restricted, some part of the reflector carrier may be fixed to the light source support or to the housing of the helicopter search light employing a stationary but flexible support, which flexes in order to allow another part of the reflector carrier to move in a restricted angular range. A stationary flexible support allows for avoiding a classical joint comprising at least two parts, such as a hub supporting a rotatable axis, moving (sliding) with respect to each other. It further provides a very stable connection between the light source support and the reflector carrier. Such a configuration avoids wear and enhances the stability and reliability, even under adverse environmental conditions, such as considerable accelerations, vibrations, and temperatures. In consequence, the reflector carrier is less prone to moving out of a desired position due to vibrations and other movements of the housing. As a result, the vertex points of the reflectors may be positioned with an accuracy of at least 0.01" with respect to the corresponding light sources, resulting in a high efficiency of the reflectors.

In an embodiment, the reflector carrier comprises an outer rim, in particular a circular outer rim, and a plurality of spokes extending between the outer rim and a central portion of the reflector carrier. The central portion in particular may stationary and the spokes may be flexible. Flexible spokes allow the rim to move over a predetermined angular range with respect to a stationary central portion.

Flexible spokes provide a reliable support of the reflector carrier, in particular a reflector carrier comprising an outer rim. A reflector carrier comprising only a central hub, an outer rim and a plurality of flexible spokes extending between the hub and the rim has a low weight (mass) and therefore may be moved easily by applying only small driving forces. In consequence, small and cheap actuators may be used for moving the reflector carrier.

The reflector carrier in particular may be made from a (low weight) plastic material. A reflector carrier having a low mass further facilitates an exact positioning of the reflector(s) as the risk of overshooting the desired target position is considerably reduced. It further allows the reflector carrier to move and respond fast.

In an embodiment, the spokes are s-shaped. S-shaped spokes may be elastically deformed easily for allowing the reflector carrier to move (rotate) in the circumferential direction; at the same time, s-shaped sprockets provide the desired strength in the radial direction in order to prevent an undesired linear movement of the reflector carrier.

In an embodiment, the actuator comprises a permanent magnet and a plurality of electric coils. In a first configuration, a permanent magnet is attached to the reflector carrier while a plurality of electric coils are attached to the light source support. The light source support in particular may be a printed circuit board (PCB) comprising electrical lines for supplying electrical power to the light sources and to the coils.

In an alternative configuration, a permanent magnet is attached to the light source support and the plurality of electric coils are attached to the reflector carrier. In both configurations the reflector carrier and, in consequence, the reflector(s) may be moved with respect to the light source support by selectively supplying electrical power to at least one of the coils.

Iron cores (yokes), in particular soft iron cores, may be arranged in each of the coils in order to amplify the electromagnetic forces generated by the coils when an electrical current is flowing through the coils.

It is also possible that the helicopter search light comprises a plurality of actuators, each comprising a permanent magnet, interacting with a plurality of electric coils, as described above for the case of one permanent and a plurality of electric coils associated therewith. The helicopter search light may then have a plurality of permanent magnets and a plurality of electric coils, with the number of electric coils being a multiple of the number of permanent magnets.

The at least one permanent magnet and the plurality of coils in particular may form a partial brushless stepper motor using the cogging torque of the residual remanence between the at least one permanent magnet and the soft iron cores extending through the coils.

In an embodiment, the actuator is designed such that the cogging torque is sufficiently high for the reflector to stay in any of its discrete positions even if no electrical energy is supplied to any of the coils.

In an embodiment, the actuator in particular may comprise at least one permanent magnet and at least one group of coils, each group of coils being associated with one permanent magnet. Each group of coils comprises a plurality of coils, and each coil is associated with one of the discrete positions. In consequence, the reflector carrier and also the reflector(s) supported by the reflector carrier may be positioned in a selected discrete position by supplying electrical energy to at least one of the coils which corresponds to the selected position.

In an embodiment, each coil is associated with at least one of the light sources such that electrical current is supplied simultaneously to a coil and the at least one associated light source. In such as configuration the reflector carrier is automatically moved into a position in which the reflector(s) reflect(s) the light emitted by the activated light sources. Thus, an undesirable situation, in which light sources are activated but the light emitted by the activated light sources is not reflected by one of the reflectors, is avoided. Additionally, the amount of wiring extending between the helicopter search light and the fuselage/cockpit of the helicopter and/or between the helicopter search light and the on-board electricity system may be reduced. The coils may be connected in series or in parallel with the associated light source(s).

In an embodiment, an additional coil switch may be provided. The coil switch is configured for interrupting the supply of power to the at least one coil as soon as the reflector carrier has been positioned in the desired position. Interrupting (switching off) the power supplied to the coil(s) saves electrical energy and reduces the heat produced by the helicopter search light. In consequence, a helicopter search light comprising such a switch may be operated more efficiently.

In an embodiment, each of the light sources comprises at least one light emitting element, the light emitting element in particular may be or include at least an LED. LEDs provide highly efficient light sources. Providing a plurality of light emitting elements in a single light source allows increasing the intensity of the light emitted by the light source. It further allows adjusting the intensity of the light emitted by the light source by selectively changing the number of light emitting elements which are switched on.

The additional features, modifications, and effects, described herein with respect to the helicopter search light, apply to the helicopter comprising such helicopter search light and to the method of operating a helicopter search light in an analogous manner.

BRIEF DESCRIPTION OF THE DRAWINGS

In the following, an exemplary embodiment of a helicopter search light is described with reference to the enclosed figures.

DETAILED DESCRIPTION

Figure 1:
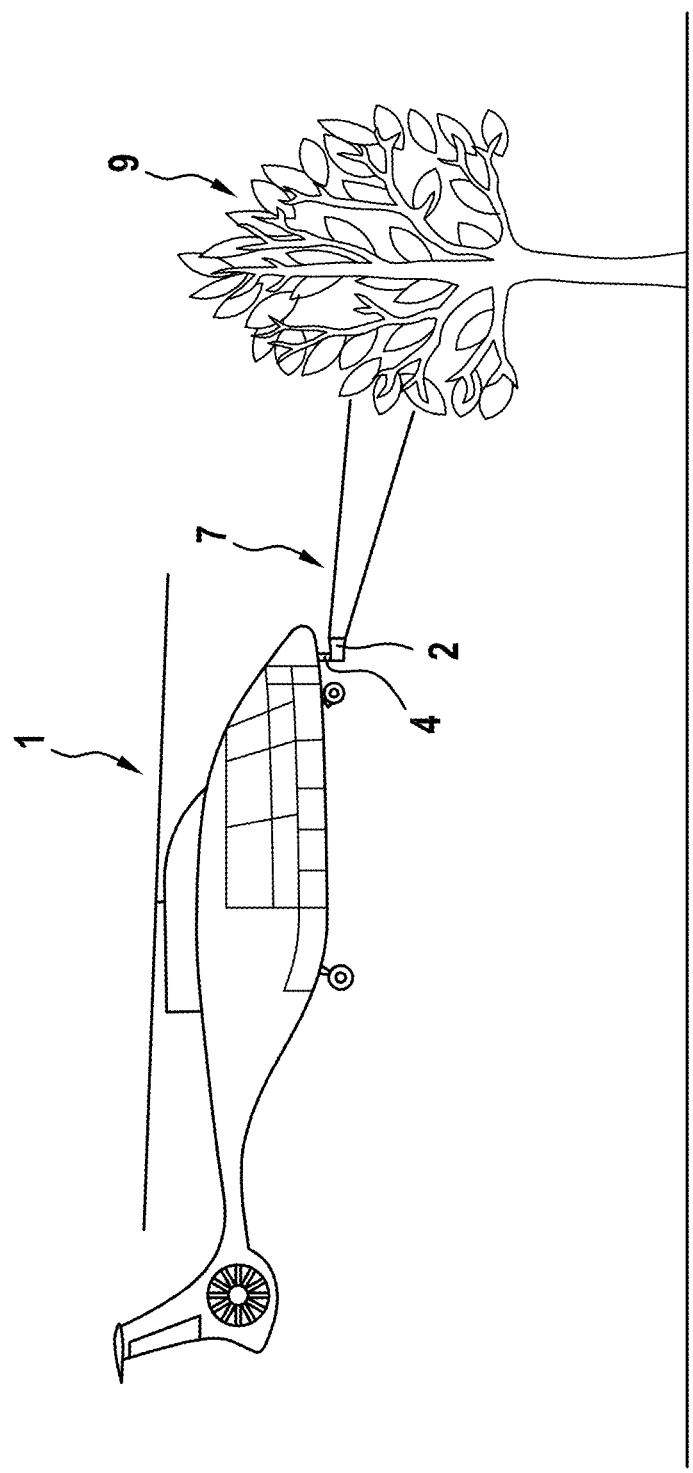
FIG. 1 shows a helicopter with a helicopter search light attached to the helicopter.

FIG. 1 depicts a helicopter 1 in front of a target or obstacle 9. The helicopter 1 is equipped with a helicopter search light 2, which is attached to the fuselage of the helicopter 1 by means of a mounting portion 4. The helicopter search light 2 emits a beam 7 of light.

Figure 2:
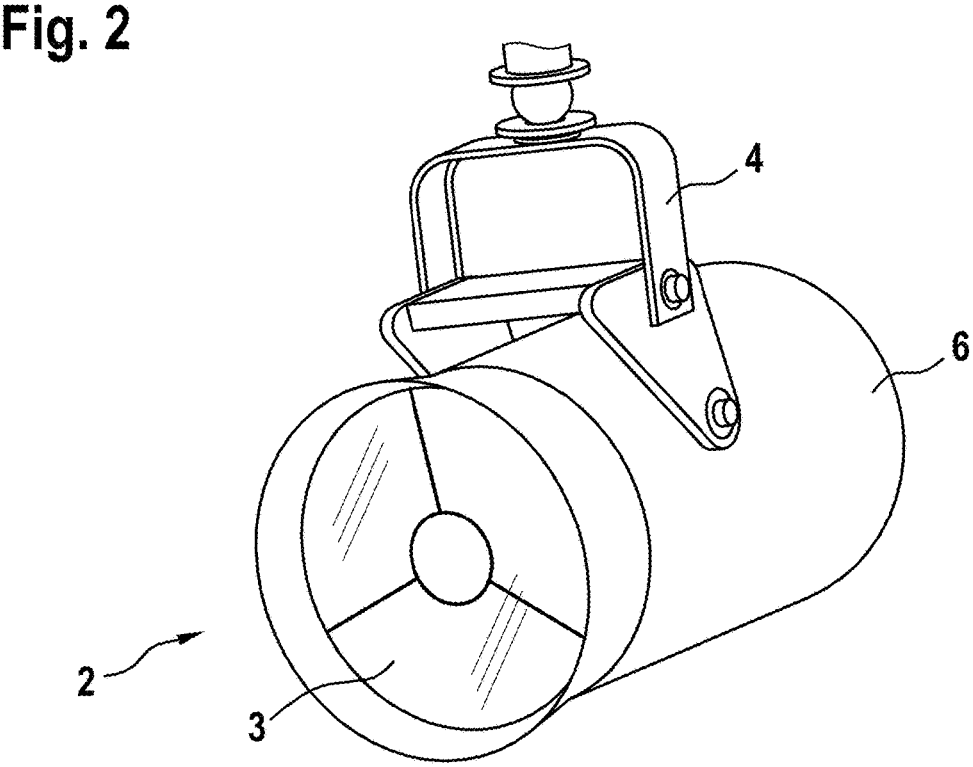
FIG. 2 shows a schematic view of a helicopter search light comprising a housing and a mounting portion.

FIG. 2 shows a helicopter search light 2 comprising a housing 6 and a mounting portion 4. The housing 6 includes a transparent front cover 3 and the helicopter search light 2 is configured for emitting light via said transparent front cover 3.

The mounting portion 4 allows for moving the helicopter search light 2, in particular for rotating the helicopter search light 2 around at least two axes in order to direct a beam 7 of light, which is emitted by the helicopter search light 2, onto a target or obstacle 9 (cf. FIG. 1).

Figure 3:
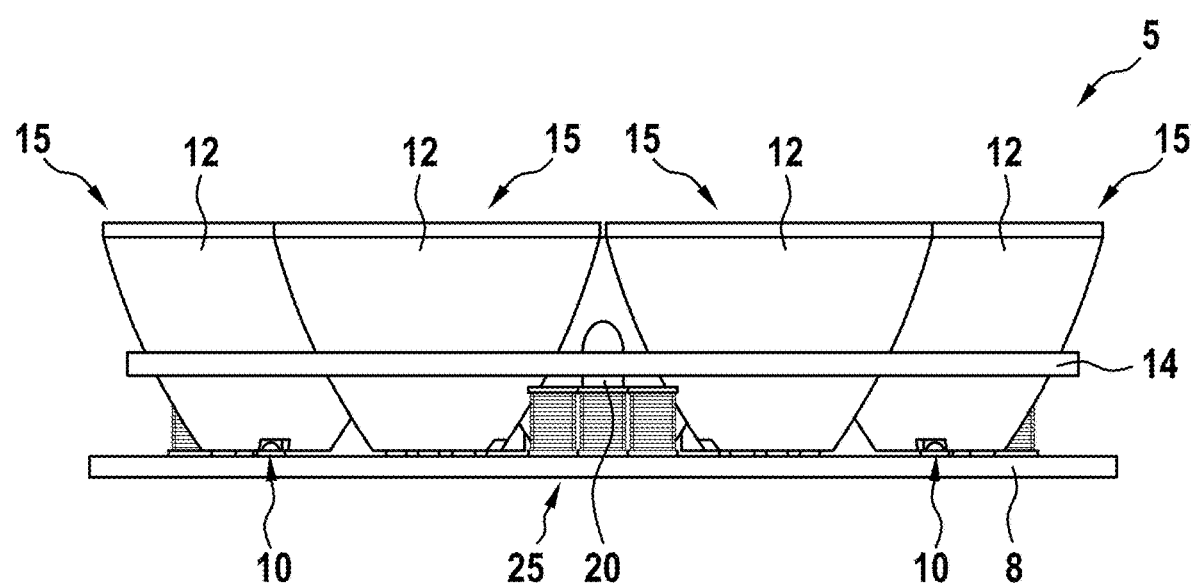
FIG. 3 shows a schematic side view of a light generation device as it is employed in a helicopter search light according to an exemplary embodiment of the invention.
Figure 4:
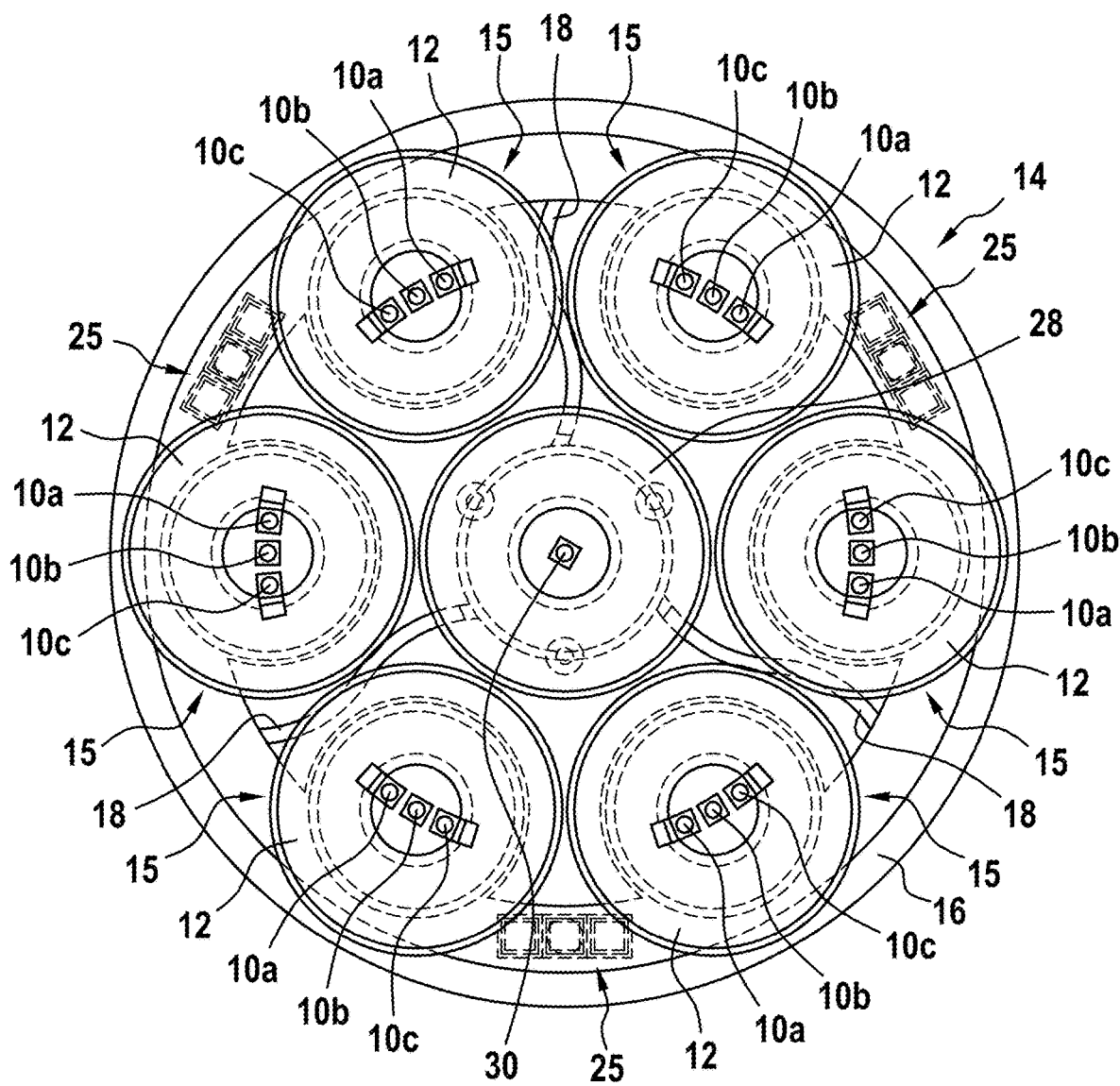
FIG. 4 shows a schematic top view of the light generation device.

FIG. 3 depicts a schematic side view of a light generation device 5 which is employed in the helicopter search light 2; and FIG. 4 shows a schematic top view of the light generation device 5.

The light generation device 5 is accommodated within the housing 6, which is not depicted in FIGS. 3 and 4.

The light generation device 5 comprises a light source support 8, in particular a printed circuit board (PCB), supporting a plurality of light sources 10a, 10b, 10c. The light sources 10a, 10b, 10c in particular may be or include LEDs.

The light source support 8 provides a heat sink for absorbing and dissipating heat generated by the light sources 10a, 10b, 10c. In order to enhance the transportation and dissipation of the heat, a heat-conductive material may be provided between the light sources 10a, 10b, 10c and the light source support 8. Additionally or alternatively, the light source support 8 may be provided with an additional cooling element/heat sink, which is not shown in the figures.

Figure 5:
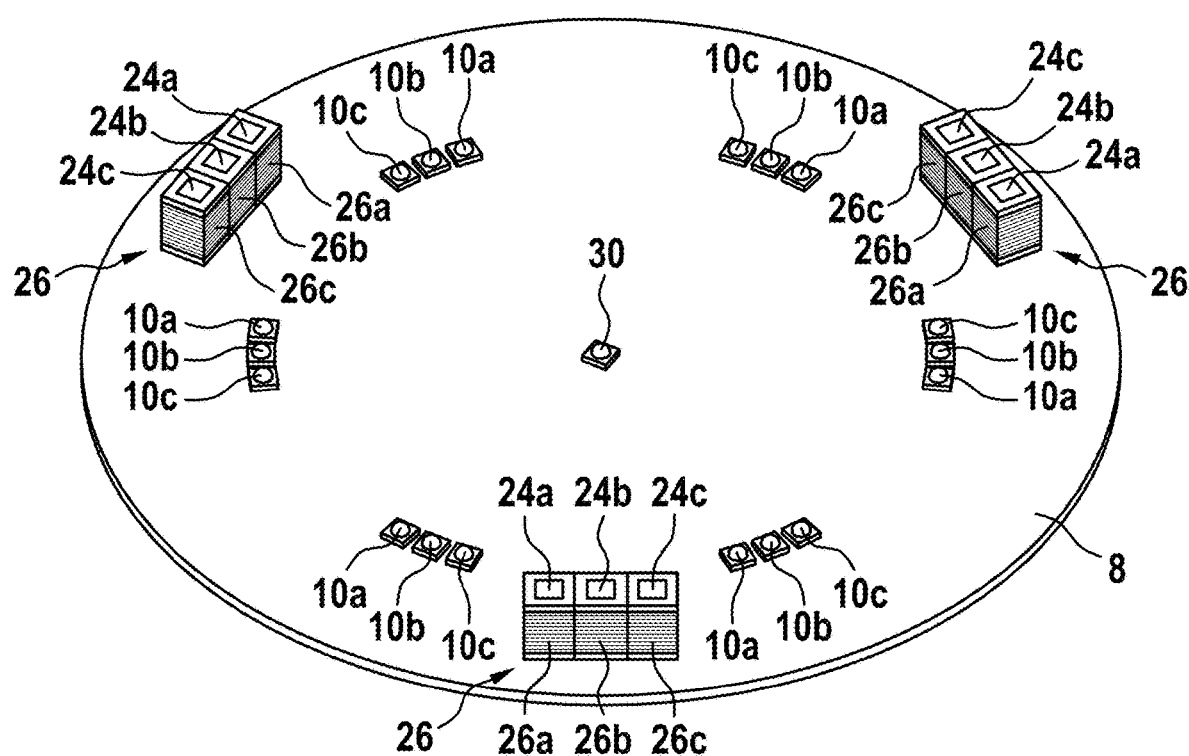
FIG. 5 shows a perspective view of the light source support of the light generation device.

FIG. 5 shows a perspective view of the light source support 8, which is provided in the form of a circular plate.

The embodiment of the light generation device 5 shown in the figures comprises six groups 10 of three light sources 10a, 10b, 10c, respectively, which are arranged along a first circular outline which is centered around the center of the circular light source support 8.

Each group 10 of light sources 10a, 10b, 10c comprises three light sources 10a, 10b, 10c, respectively. The depicted configuration of light sources 10a, 10b, 10c, however, is only one of a plurality of possibilities, and the skilled person will understand that both the number of groups 10 of light sources 10a, 10b, 10c as well as the number of light sources 10a, 10b, 10c, comprised in each group 10, may be varied according to the respective application scenario.

The light sources 10a, 10b, 10c in particular may be selected so that the light emitted by the different light sources 10a, 10b, 10c of each group 10 has different characteristics, e.g. different colors, wavelengths and/or spectra.

The light sources 10a, 10b, 10c in particular may be selected from light sources 10a, 10b, 10c emitting "white light" having a color temperature of 4000 to 6900 K, "deep red light" having a wavelength of more than 630 nm, "selective yellow light" with less than 50% spectral distribution power (SPD) below 500 nm vs. the overall peak, "mint light" including wavelengths between 480 nm and 515 nm, and infrared (IR) light, which is not visible to the human eye but may be seen by an appropriate camera, which may be part of a night vision device.

An additional central light source 30 is provided at the center of the circular light source support 8.

The light source support 8 also supports at least one group 26 of electric coils 26a, 26b, 26c being part of an electromagnetic actuator 25, which will be described in more detail further below. In the embodiment shown in the figures, three groups 26 of electric coils 26a, 26b, 26c are arranged on a second circular outline, which is arranged coaxial with the first circular outline but which has a larger diameter than the first circular outline. The groups 26 of electric coils 26a, 26b, 26c are spaced apart at angular distances of 120° with respect to each other along the second circular outline.

On the side of the light source support 8 supporting the light sources 10a, 10b, 10c, a reflector carrier 14 supporting a plurality of light reflectors 12 is arranged in some distance from the light source support 8. The number of reflectors 12 corresponds with the number of groups 10 of light sources 10a, 10b, 10c. Each combination of a reflector 12 and a corresponding group 10 of light sources 10a, 10b, 10c constitutes an optical system 15.

Figure 6:
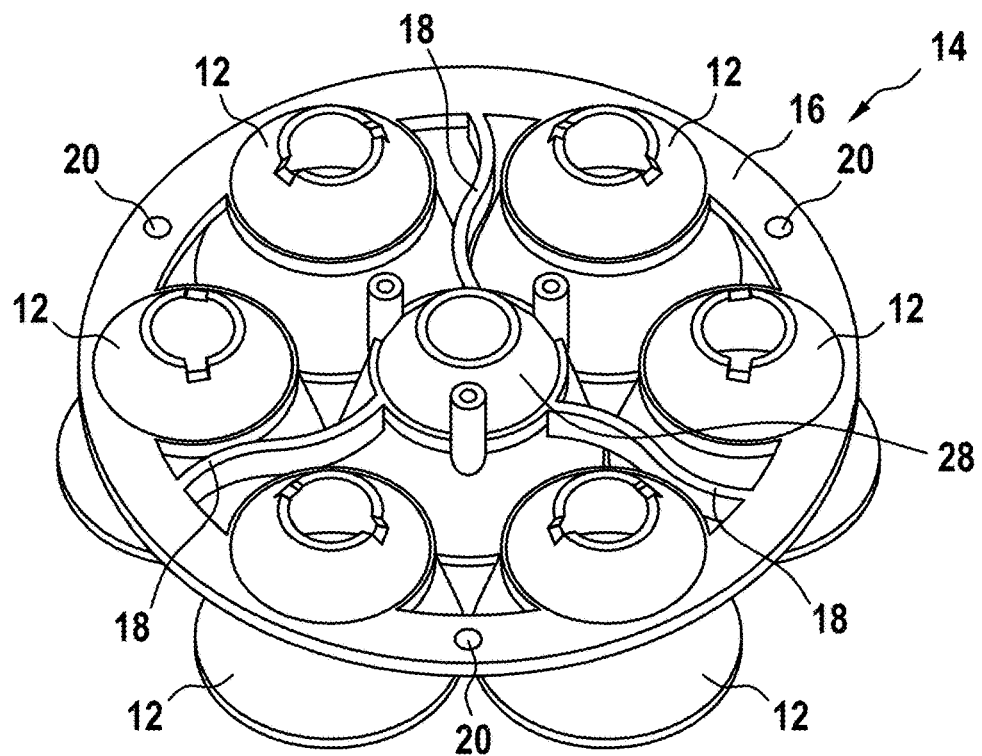
FIG. 6 shows a perspective view of a reflector carrier and its reflectors of the light generation device.

FIG. 6 shows a perspective view of the reflector carrier 14 and the reflectors 12 from a "rear side" facing the light source support 8 and the light sources 10a, 10b, 10c when the light source support is mounted to the light generation device 5.

The reflector carrier 14 comprises a circular outer rim 16 supporting the reflectors 12. The reflectors 12 are provided as hollow bodies which are provided with a light reflecting surface on their insides. The reflectors 12 may have rotational symmetry with respect to a respective central axis; they in particular may be parabolic reflectors 12. Each reflector 12 has a vertex point, which is a virtual vertex point, because the reflectors 12 do not extend to their respective vertex points. An optimized light emission may be reached when a light source 10a, 10b, 10c is positioned at the vertex of the reflector 12.

The outer rim 16 is connected to a central portion 28 of the reflector carrier 14 by means of three spokes 18, extending between the outer rim 16 and the central portion 28 of the reflector carrier 14. The spokes 18 are made from a flexible material and they are s-shaped. This allows the spokes 18 to deform in the circumferential direction. In consequence, the outer rim 16 of the reflector carrier 14 is able to rotate in the circumferential direction over a limited angular range even if the central portion 28 of the reflector carrier 14 is fixed and does not move.

The skilled person will understand that the number and the shape of the spokes 18, as shown in the figures, are only exemplary and that different number and shapes of the spokes 18 may be employed.

In the embodiment shown in FIGS. 4 and 5, the central portion 28 is provided in the form of an additional central reflector, which is configured for reflecting the light emitted by the central light source 30 provided at the center of the light source support 8. The central light source 30 and the additional central reflector are an entirely optional feature.

Three permanent magnets 20 are attached to or embedded into the outer rim 16. In the embodiment shown in the figures, the permanent magnets 20 are spaced apart at angular distances of 120° with respect to each other. The positions of the permanent magnets 20 in particular correspond to the positions of the three groups 26 of electric coils 26a, 26b, 26c, provided on the light source support 8. The permanent magnets 20 in combination with the electric coils 26a, 26b, 26c constitute actuators 25, which are configured for moving the reflector carrier 14 with respect to the light source support 8 in the circumferential direction and which will be described in more detail below with reference to FIG. 7.

Figure 7:
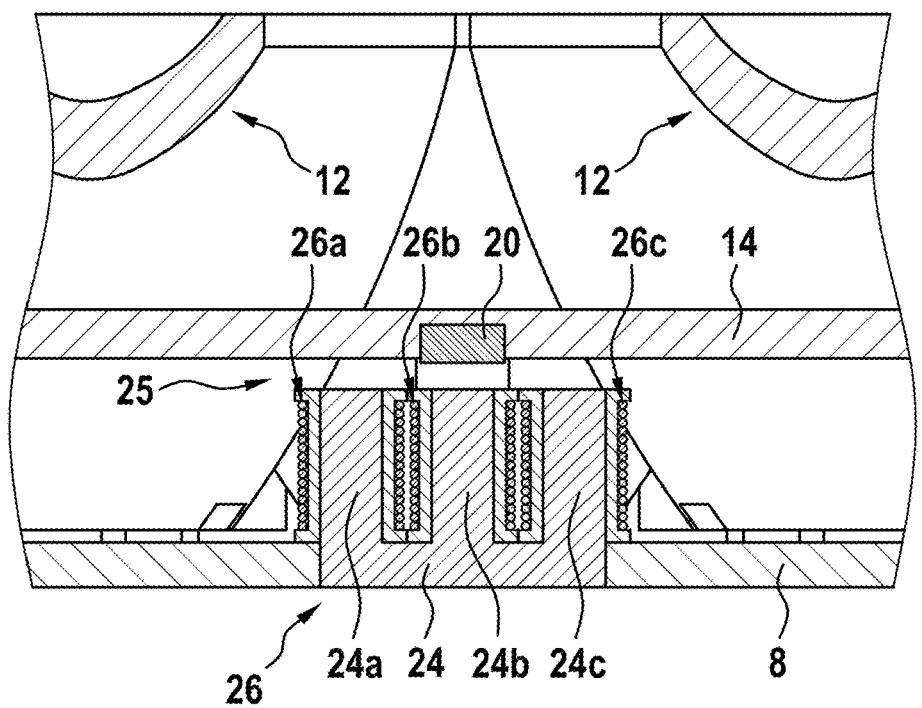
FIG. 7 depicts an enlarged sectional view of one of the actuators of the light generation device.

FIG. 7 depicts an enlarged sectional view of one of the actuators 25.

Each actuator 25 comprises a group 26 of electric coils 26a, 26b, 26c arranged next to each other. The number of electric coils 26a, 26b, 26c in each group 26 in particular corresponds to the number of light sources 10a, 10b, 10c in each group 10 of light sources 10a, 10b, 10c. Thus, in the embodiment shown in the figures, each actuator 25 comprises three electric coils 26a, 26b, 26c.

The actuator 25 further comprises a stator core 24 including three yokes 24a, 24c, 24c, which may be made of soft iron. Each yoke 24a, 24c, 24c extends through one of the electric coils 26a, 26b, 26c.

A permanent magnet 20, which is attached to or embedded into the outer rim 16 of the reflector carrier 14, is arranged next to the ends of the yokes 24a, 24c, 24c.

The permanent magnet 20 in combination with the electric coils 26a, 26b, 26c provides a kind of brushless stepper motor which allows moving the permanent magnet 20 and, in consequence, the outer rim 16 of the reflector carrier 14 by selectively supplying electrical power to one of the electric coils 26a, 26b, 26c.

As a result, the outer rim 16 of the reflector carrier 14 and the reflectors 12 attached to the outer rim 16 will rotate around the central portion 28 of the reflector carrier 14 so that the vertexes of the reflectors 12 may be selectively positioned to coincide with the positions of respective ones of light sources 10a, 10b, 10c, selected from each group 10 of light sources 10a, 10b, 10c.

In consequence, the kind (characteristics) of light emitted by the helicopter search light 2 may be selected by providing electrical power to the appropriate electric coil(s) 26a, 26b, 26c in order to move the reflectors 12 over those light sources 10a, 10b, 10c which emit the desired kind of light, i.e. light having the desired characteristics.

The outer rim 16 and the spokes 18 may be made from a light material, such as a plastics material, in order to minimize the mass of the reflector carrier 14. The reflector carrier 14 in particular may be made of an extruded or molded plastics material. The reflectors 12 also may be made of the extruded or molded plastics material that is coated with a light reflecting coating on the inside of the reflectors 12, in order to provide the desired light reflecting properties.

The actuators 25 and the spokes 18 of the reflector carrier 14 are configured such that the forces generated by the actuators 25 are large enough to deform the flexible spokes 18 in order to move the reflectors 12 over a restricted angular range, e.g. an angular range of e.g. +/− 14°, with respect to a reference position, e.g. a central reference position which corresponds to a position of the outer rim 16 in which the permanent magnet 20 is positioned vis-a-vis the central coil 26b.

In the described configuration, there is no need for a classical joint comprising at least two parts, such as a hub supporting a rotatable axis, moving with respect to each other. Thus, the described configuration is stiff in all axes but the axis of rotation of the outer rim 16, which is oriented orthogonally to the plane of the light source support 8. The described configuration avoids wear and enhances the stability and reliability of the actuating mechanism in particular under adverse environmental conditions, such a considerable accelerations, vibrations, and temperature variations. As a result, the vertex points of the reflectors 12 may be positioned with an accuracy of at least 0.01" with respect to the corresponding light sources 10a, 10b, 10c. This results in a high optical efficiency of the light generation device 5.

The spokes 18 are designed so that the cogging torque, which results from the residual remanence of the yokes 24a, 24c, 24c, is larger than the restoring force resulting from the elastic deformation of the spokes 18. In consequence, the reflector carrier 14 stays in a selected position even if the electrical power supplied to the electric coils 26a, 26b, 26c is switched off. The reflector carrier 14 in particular may be fixed by the cogging torque such that there is no play beyond 0.01" between the reflectors 12 and the selected light source 10a, 10b, 10c, even if the electrical power supplied to the electric coils 26a, 26b, 26c is switched off.

In other words, electrical power needs to be supplied to the electric coils 26a, 26b, 26c only for changing the position of the reflector carrier 14 in order to change the characteristics of the emitted light, but no electrical power needs to be supplied for maintaining the selected position of the reflector carrier 14. This reduces the overall energy consumption of the helicopter search light 2, as electrical power needs to be supplied to the electric coils 26a, 26b, 26c only over relatively short periods of time.

Each electric coil 26a, 26b, 26c may be electrically connected to at least one of the light sources 10a, 10b, 10c such that electrical current is supplied simultaneously to a coil 26a, 26b, 26c and the at least one associated light source 10a, 10b, 10c.

In such a configuration, the reflector carrier 14 is automatically moved into a position in which the reflectors 12 reflect the light emitted by the activated light sources 10a, 10b, 10c. Thus, an undesirable situation, in which some light sources 10a, 10b, 10c are activated but the light emitted by the activated light sources 10a, 10b, 10c is not reflected by one of the reflectors 12 since they are out of position, is avoided. The electric coils 26a, 26b, 26c may be connected in series or in parallel with the associated light source(s) 10a, 10b, 10c.

Figure 8:
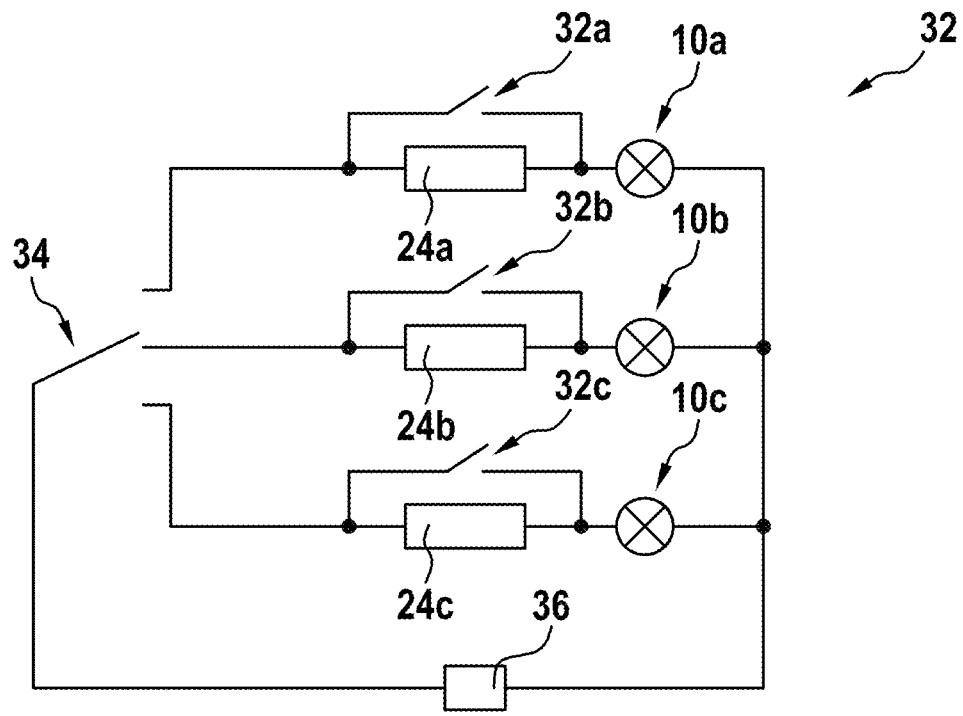
FIG. 8 shows a first example of an electric circuit for driving a helicopter search light according to an exemplary embodiment of the invention.

FIG. 8 shows an example of an electric circuit 32 for driving a helicopter search light 2 according to an exemplary embodiment of the invention, in which the electric coils 26a, 26b, 26c are connected in series with the respectively associated light sources 10a, 10b, 10c.

Figure 9:
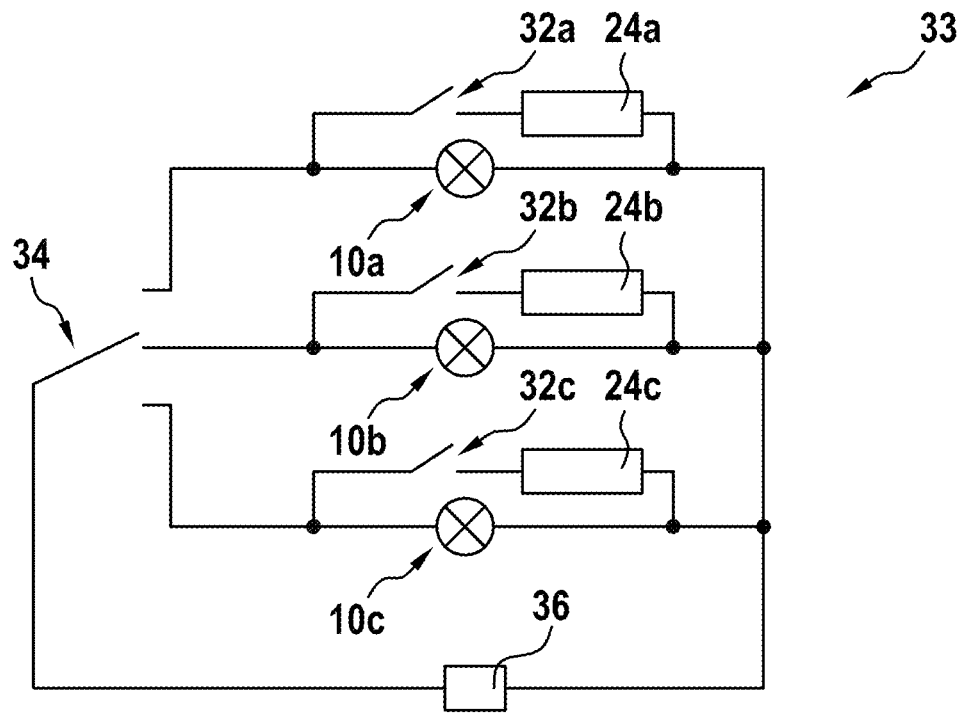
FIG. 9 shows a second example of an electric circuit for driving a helicopter search light according to an exemplary embodiment of the invention.

FIG. 9 shows an example of an electric circuit 33 for driving a helicopter search light 2 according to an exemplary embodiment of the invention, in which the electric coils 26a, 26b, 26c are connected in parallel with the respectively associated light sources 10a, 10b, 10c.

A selection switch 34, which may be a mechanical switch or an electronic switching device, selectively connects a power supply 36, which usually is located inside the helicopter 1 but which also may be a battery arranged within the helicopter search light 2, with a selected one of the electric coils 26a, 26b, 26c and the associated light source 10a, 10b, 10c.

Coil switches 32a, 32b, 32c, which may be mechanical switches or electronic switching devices, allow to switch-off the electric coils 26a, 26b, 26c as soon as the reflector carrier 14 has been moved into its desired position. In the serial configuration shown in FIG. 8, the coil switches 32a, 32b, 32c bypass the electric coils 26a, 26b, 26c as soon as the reflector carrier 14 has been moved into its desired position.

The coil switches 32a, 32b, 32c in particular may be electronic switching devices which automatically switch-off/bypass the electric coils 26a, 26b, 26c after a predetermined time interval, which is set long enough to allow the reflector carrier 14 to move into the newly selected position.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A helicopter search light comprising:
   a housing including a mounting portion, which is configured to be mounted to a helicopter;
   a light source support arranged within the housing; and
   at least one optical system, each optical system including:
   a group of at least two light sources having different light emission characteristics and being arranged on the light source support; and
   a reflector, which is movable between at least two discrete positions, each position being associated with one of the at least two light sources, with the reflector in each position only reflecting light emitted by the associated light source; and
   at least one actuator, which is configured for selectively moving the reflector between the at least two discrete positions;
   wherein the reflector is attached to a movable reflector carrier and the at least one actuator is configured for selectively moving the reflector carrier;
   wherein each of the at least one actuator comprises a permanent magnet and a plurality of electric coils, wherein either the permanent magnet or the plurality of coils is attached to the reflector carrier and an other one of the permanent magnet and the plurality of coils is attached to the light source support;
   wherein each coil is associated with at least one of the light sources such that electrical current is supplied simultaneously to the coil and the at least one associated light source.

2. The helicopter search light according to claim 1, wherein the reflector carrier is rotatable, wherein the reflector carrier in is rotatable by not more than +/−20°, from a reference position.

3. The helicopter search light according to claim 1, wherein the reflector carrier comprises an outer rim, in particular a circular outer rim, and a plurality of spokes extending between the outer rim and a central portion of the reflector carrier.

4. The helicopter search light according to claim 3, wherein the central portion is stationary and wherein the spokes are flexible allowing the outer rim to move with respect to the stationary central portion, wherein the spokes are in particular s-shaped.

5. The helicopter search light according to claim 1, wherein each coil is electrically connected in series or in parallel with the at least one associated light source.

6. The helicopter search light according to claim 1, wherein each of the light sources comprises at least one light emitting element, wherein the light emitting elements in particular are or include LEDs.

7. The helicopter search light according to claim 1, wherein each group of light sources comprise two to five light sources emitting light having different characteristics, wherein the different light characteristics are selected from "white light" having a color temperature of 4000 to 6900 K, "deep red light" having a wavelength of more than 630 nm, "selective yellow light" with less than 50% spectral distribution power below 500 nm vs. the overall peak, "mint light" including wavelengths between 480 nm and 515 nm, and infrared light.

8. The helicopter search light according to claim 1, comprising between two and ten optical systems.

9. The helicopter search light according to claim 1, wherein the light sources are arranged on a circular outline and wherein the optical center of the reflector is arranged on the same circular outline.

10. A helicopter comprising the helicopter search light according to claim 1.

11. A method of operating a helicopter search light comprising at least one optical system, each optical system including a group of at least two light sources having different light emission characteristics, and a reflector, which is movable between at least two discrete positions, each position being associated with one of the at least two light sources, and comprising at least one actuator, which is configured for selectively moving the reflector between the at least two discrete positions,
wherein the reflector is attached to a movable reflector carrier and the at least one actuator is configured for selectively moving the reflector carrier; and
wherein each of the at least one actuator comprises a permanent magnet and a plurality of electric coils, wherein either the permanent magnet or the plurality of coils is attached to the reflector carrier and wherein the other one of the permanent magnet and the plurality of coils is attached to the light source support; and
wherein each coil is associated with at least one of the light sources such that electrical current is supplied simultaneously to the coil and the at least one associated light source; and
wherein the method comprises:
operating the at least one actuator for moving the reflector into a desired position in which the reflector reflects light which is emitted by a selected light source; and
supplying electrical power to the selected light source.

12. A helicopter search light comprising:
a housing including a mounting portion, which is configured to be mounted to a helicopter;
a light source support arranged within the housing; and
at least one optical system, each optical system including:
a group of at least two light sources having different light emission characteristics and being arranged on the light source support; and
a reflector, which is movable between at least two discrete positions, each position being associated with one of the at least two light sources, with the reflector in each position only reflecting light emitted by the associated light source; and
at least one actuator, which is configured for selectively moving the reflector between the at least two discrete positions;
wherein the reflector is attached to a movable reflector carrier and the at least one actuator is configured for selectively moving the reflector carrier;
wherein the reflector carrier comprises a circular outer rim and a plurality of spokes extending between the outer rim and a central portion of the reflector carrier;
wherein the central portion is stationary and wherein the spokes are flexible allowing the outer rim to move with respect to the stationary central portion.

13. A helicopter search light according to claim 12, wherein the spokes are s-shaped.

14. The helicopter search light according to claim 12, wherein the reflector carrier is rotatable, wherein the reflector carrier is rotatable by not more than +/−20°, from a reference position.

15. The helicopter search light according to claim 12, wherein each of the at least one actuator comprises a permanent magnet and a plurality of electric coils, wherein either the permanent magnet or the plurality of coils is attached to the reflector carrier and wherein the other one of the permanent magnet and the plurality of coils is attached to the light source support.

16. The helicopter search light according to claim 15, wherein each coil is associated with at least one of the light sources such that electrical current is supplied simultaneously to the coil and the at least one associated light source.

17. The helicopter search light according to claim 16, wherein each coil is electrically connected in series or in parallel with the at least one associated light source.

18. The helicopter search light according to claim 12, wherein each of the light sources comprises at least one light emitting element, wherein the light emitting elements in particular are or include LEDs.

19. The helicopter search light according to claim 12, wherein each group of light sources comprise two to five light sources emitting light having different characteristics, wherein the different light characteristics are selected from "white light" having a color temperature of 4000 to 6900 K, "deep red light" having a wavelength of more than 630 nm, "selective yellow light" with less than 50% spectral distribution power below 500 nm vs. the overall peak, "mint light" including wavelengths between 480 nm and 515 nm, and infrared light.

* * * * *